M. LEBLANC.
METHOD OF AND MEANS FOR BALANCING ROTATING BODIES.
APPLICATION FILED OCT. 9, 1913.
1,210,085.
Patented Dec. 26, 1916.
4 SHEETS—SHEET 2.
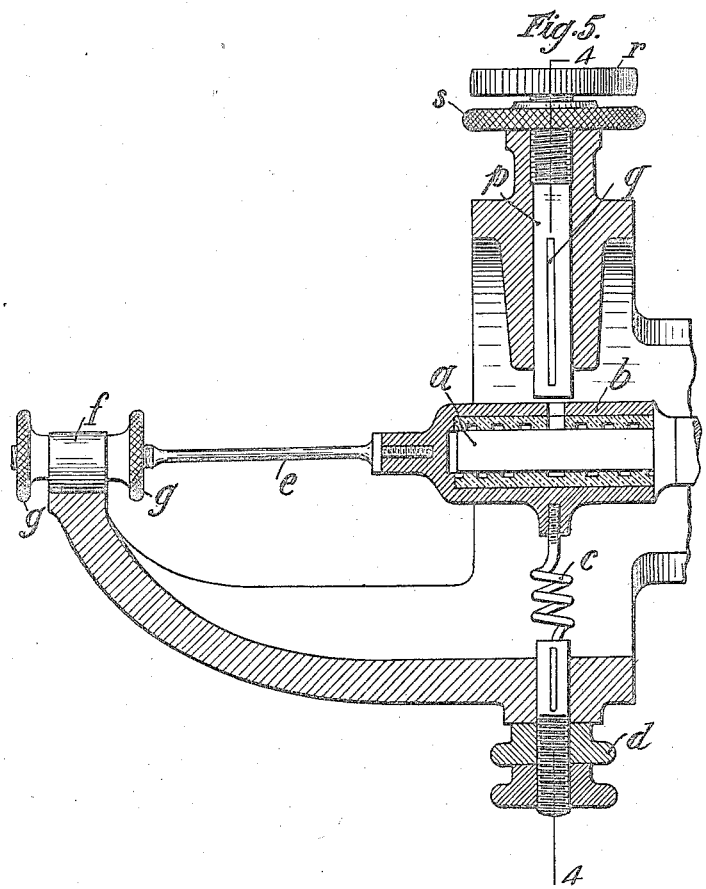
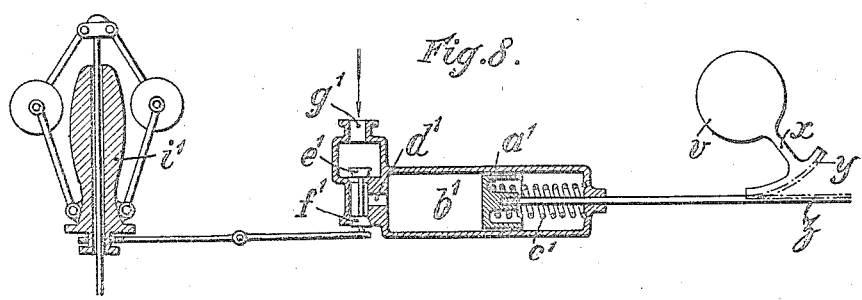
WITNESSES
INVENTOR
BY
HIS ATTORNEY IN FACT.

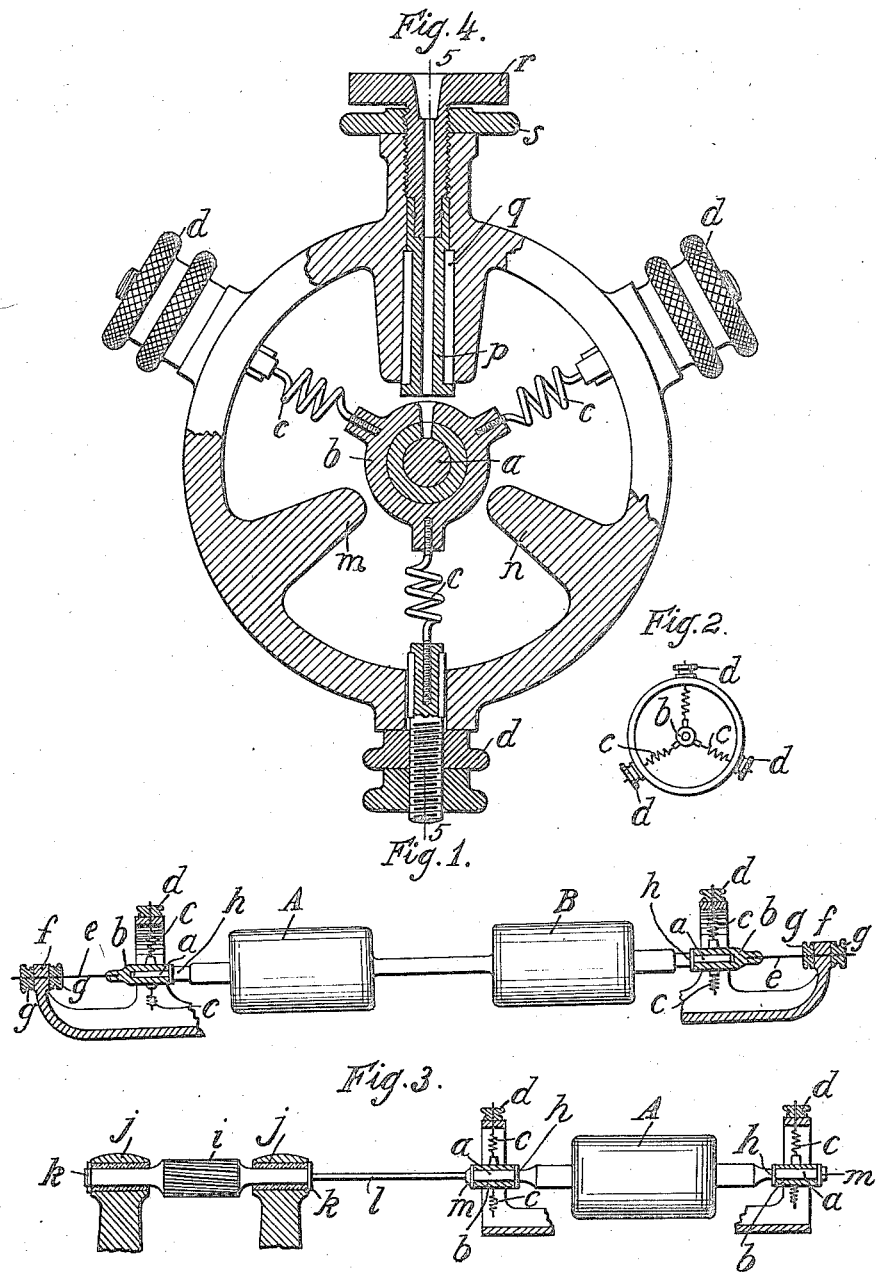

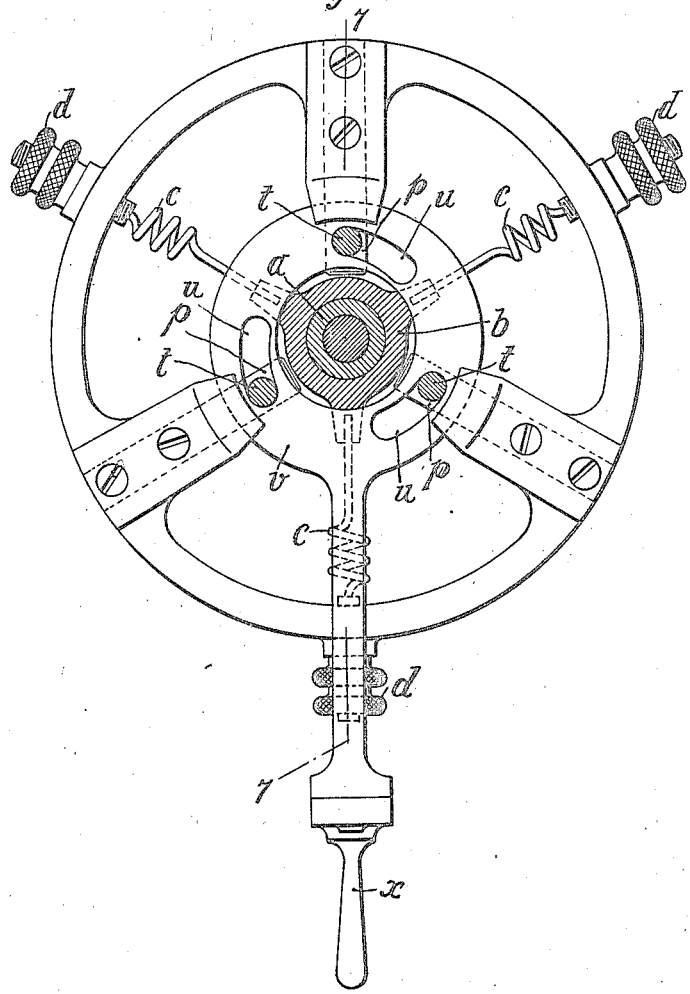

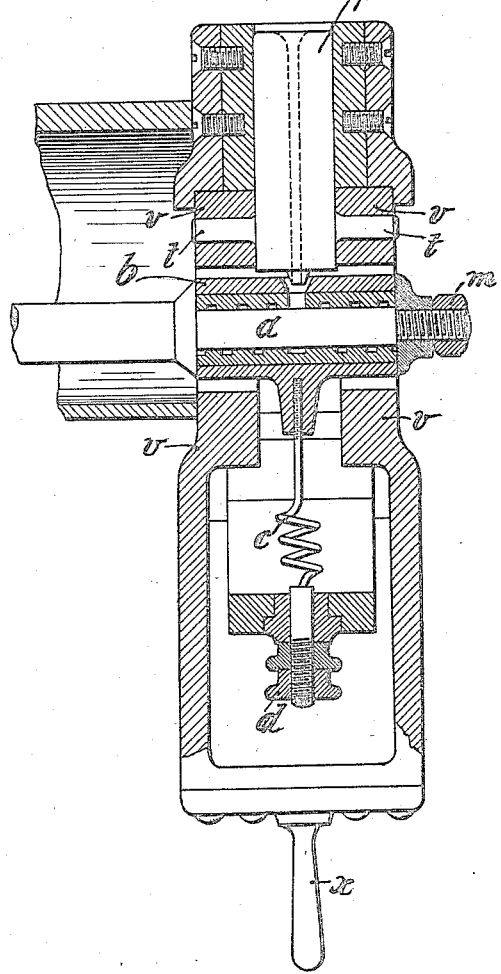

UNITED STATES PATENT OFFICE.

MAURICE LEBLANC, OF VAL SUR SEINE, PAR CROISSY, FRANCE, ASSIGNOR TO SOCIÉTÉ ANONYME POUR L'EXPLOITATION DES PROCÉDÉS WESTINGHOUSE-LEBLANC, OF PARIS, FRANCE.

METHOD OF AND MEANS FOR BALANCING ROTATING BODIES.

1,210,085.      Specification of Letters Patent.      Patented Dec. 26, 1916.

Application filed October 9, 1913. Serial No. 794,290.

*To all whom it may concern:*

Be it known that I, MAURICE LEBLANC, a citizen of the Republic of France, and a resident of Val sur Seine, par Croissy, Seine-Oise, France, have made a new and useful Invention in the Methods of and Means for Balancing Rotating Bodies, of which the following is a specification.

If it is desired to communicate a high angular velocity to a rotary body it is desirable that such body should at all times be free to select its axis of rotation, in order that it may rotate around one of its principal axes of inertia passing through its center of gravity.

With this object in view the arrangements illustrated in Figures 1, 2 and 3 of the accompanying drawings may be used; these furnish the rotary body with the necessary freedom.

Fig. 1 is a side elevation of apparatus embodying my invention, portions being shown in section for convenience of illustration. Fig. 2 is an end elevation of the apparatus shown in Fig. 1. Fig. 3 is a side elevation of a modified form of apparatus embodying my invention, portions being shown in vertical section for convenience of illustration. Fig. 4 is a transverse sectional view along the line 4—4 of Fig. 5 and illustrates a detail of my invention. Fig. 5 is a longitudinal sectional view along the line 5—5 of Fig. 4. Fig. 6 is an end view of the apparatus shown in Fig. 7, portions being shown in transverse section for convenience of illustration. Fig. 7 is a sectional view along the line 7—7 of Fig. 6 and illustrates a modified arrangement of bearing and abutment members forming a detail of my invention. Fig. 8 is a diagrammatic sectional view of an operating mechanism for the abutments shown in Figs. 6 and 7.

The rotary body may consist of the combination on the same shaft of a driving rotor A and a driven rotor B (Fig. 1). With such an arrangement it is not necessary to transmit any torque to the rotary body and it is sufficient to support the same in such a manner that: (1) In a state of rest its geometrical axis occupies a predetermined position in space. (2) Its lateral displacements may be strictly limited. In this case the arrangement illustrated in Fig. 1 may be adopted. The shaft of the rotor terminates in two small journals $a\ a$ carried in bearings $b\ b$ which are made as light as possible. Each of these is supported by three springs $c\ c\ c$ situated at 120° apart (Figs. 1 and 2). Regulating screws $d\ d\ d$ enable the bearing to be brought into the desired position in spite of the effect of the weight of the rotary body. To limit the lateral displacements of the rotor there is mounted at each bearing a rod which should be flexible in order not to impede the displacements of the bearing, which rod abuts at its other end against a fixed point $f$. Regulating screws $g\ g$ (Fig. 1) turning on the threaded extremities of the rods $e$ enable each bearing to be moved forward or backward. In addition the shaft carries two shoulders $h\ h$ which abut against the ends of the corresponding bearings.

When it is necessary to communicate a turning movement to the rotary body this is generally because this torque is furnished by another rotor turning at a speed other than that of the first mentioned rotor otherwise the two rotors could be coupled on the same shaft. In such a case it is therefore necessary to use a speed reducing device, the shafts of which should rotate about fixed axes. With this arrangement the shaft of the speed reducing device must be connected to that of the rotor by means of a flexible shaft (Fig. 3). The high speed shaft $i$ of the speed reducing device is carried by two fixed bearings $j\ j$; two collars $k\ k$ limit its lateral play. This shaft should be perfectly rigid and is prolonged by a flexible shaft $l$ itself connected to the shaft of the rotor A (Fig. 3). The latter is in all cases supported by means of spring supported bearings similar to those just described, but they need not be provided with rods e to limit their lateral displacements. The flexible shaft limits the lateral displacements of the rotor. It is, however, desirable to mount on the shaft two additional collars m m (Fig. 3) to prevent longitudinal displacements of the bearings.

In Figs. 2 and 3 the axis of the rotor is described as being horizontal. The same arrangements are applicable if this axis is vertical. The necessary precautions must, however, be taken to enable the collars to support the weight of the rotor. This weight should also be supported either by one of the rods e (Fig. 1) or by the flexible shaft (Fig. 3). Rotary bodies for high angular velocities are however always light and there should be, therefore no difficulty in proportioning these rods or this shaft in such a way that they will not get hot, that is to say, will not bend under their axial weight, but at the same time are very flexible.

With the arrangements described above the rotor may be readily given a very low first critical speed because it only depends on the flexibility of the springs c, the rods e or the flexible shaft, the flexibility of which may be made very great. So far as the second critical speed of the rotor is concerned this may be made higher than the normal speed of rotation by making the latter higher than the first critical speed of each of the rotors A and B and that of the extremities of the shaft which connects or prolongs them; these various parts being assumed to be isolated and resting at their extremities on fixed points of support. It will be obvious that the two first critical speeds of a rotor suspended as illustrated in Figs. 1 and 3 may be made very different from one another. The first critical speed of the rotary body at the moment of starting and stopping must, however, be exceeded and this is always dangerous. The applicant has discovered a way of enabling this speed to be exceeded without danger, whatever may be the acceleration imparted to the rotary body at the moment, by making use of the method as well as the arrangements hereinafter described and forming the subject of the present invention.

If the first critical speed of the motor is sufficiently low, the method may conveniently consist in clamping up the bearings b b of the preceding figures of the drawings until this speed has been exceeded by 50% for example. During this time what occurs will take place as if there were no spring or flexible shaft and consequently no critical speed to exceed. Afterward the bearings may be freed by releasing them. Experiments have demonstrated that the unclamping of the bearings does not bring about any disturbances and in this manner the speed of a rotor has been varied from 0 to 30,000 revolutions per minute either very rapidly or very slowly, no vibration whatever of the shaft or of the springs being discernible. Similarly when stopping it is desirable to again clamp up the bearings as soon as the speed again approaches its critical point.

Experiments have further shown that more often than not it is sufficient to clamp up only one of the bearings which support the rotor. This can be easily explained; if $\alpha$ represents the first critical speed of the rotor when both bearings are free; $\beta$ the first critical speed when one of the bearings is clamped up, the two speeds $\alpha$ and $\beta$ may be sufficiently removed from one another so that at an intermediate speed $\gamma$ approaching $\frac{\alpha+\beta}{2}$ the rotation of the rotor will be perfectly stable whether one bearing is clamped up or both are free. It is sufficient therefore to proceed with one bearing clamped up so long as the speed of rotation is below $\gamma$ and with both bearings free so long as it exceeds such speed.

The operation necessary for clamping or unclamping a bearing may be effected either manually or automatically if the apparatus is provided with a tachometer which will be most frequently the case.

*First example.*—The amplitude of the displacements of the bearings should always be exceedingly small otherwise the springs and the rods or flexible shafts will rapidly become useless. This condition can be fulfilled even with a rotor which is badly balanced, if it is provided with automatic balancers such as for instance those described in the specifications of British Patent No. 8527 of 1912 and of the two patents of addition belonging thereto Nos. 16809 and 16949 of 1912.

If, as shown in Fig. 4 the bearing b is surrounded with three abutments m n and p, the two former fixed and the latter movable, the amount of play between the bearing and the abutments m n can generally be made sufficiently small so that the bearing may be screwed home against them without inconvenience by lowering the abutment p. In Fig. 4 the abutments m n and p are arranged at 120° apart between the suspension springs c c c. The abutment p runs in a fixed guide in which it is guided by an arrangement q q of grooves and keys. A screw r provided with a locknut s enables this abutment to be raised or lowered as desired. The abutment p and the screw r may be provided with a hole for conveying a lubricant to the bearing.

Fig. 5 is an axial longitudinal section of the same apparatus. The rod $e$ is the same as that in Fig. 1. In the case of a rotor furnished with a flexible shaft like that illustrated in Fig. 3, it is naturally preferable to clamp the bearing situated on the side away from the shaft. In such a case, the rod $e$ is dispensed with and the bearing is maintained in place by means of a collar $m$ fast on the shaft as shown in Fig. 3. If any inconvenience is experienced in momentarily decentering the shaft of the motor during starting or stopping all three abutments may be made movable like the abutment $p$—Figs. 4 and 5—and caused to approach or recede from the bearing simultaneously.

In the arrangement shown in Figs. 6 and 7 the three abutments $p\ p\ p$ are rectangular in section and slide in housings of the same cross section carried by a fixed ring. Each of them is provided at its lower end with two pins $t\ t$ which engage in eccentric slots $u\ u$ formed in two rings $v\ v$ which can be rotated around the axis of the apparatus by means of a crank operating handle $x$. The rotation of the rings $v$ effects the displacement of the pins $t$ in the slots $u$ and consequently the advancement of the abutments $p$.

*Second example.*—The clamping or unclamping of a bearing may also be effected automatically when the rotor passes through a predetermined speed. As this operation should be effected quickly in order that the speed may not vary sensibly, use may conveniently be made of an auxiliary motor. A supply of water may be provided at a suitable height to provide the necessary power and so little of it will be necessary that no inconvenience will be experienced. For example, to operate in one direction or the other, the crank handle $x$ which governs the movements of the rings in Figs. 6 and 7 the arrangement illustrated in Fig. 8 may be employed.

The handle $x$ carries a toothed sector $y$ which engages with a rack $z$. This is located at the extremity of a piston rod $a^1$ moving in a cylinder $b^1$. A spring $c^1$ tends to move the piston toward the left, but the action of the former is overcome by the pressure of water which drives back the piston toward the right so long as it acts thereon. The end of the cylinder $b^1$ communicates by an orifice $d^1$ with a casing containing two valves $e^1$ and $f^1$ connected together in such a manner that one cannot be opened without closing the other and vice versa.

When the valve $e^1$ is open and the valve $f^1$ closed, the fluid under pressure which enters by an orifice $g^1$ flows into the cylinder and drives the piston toward the right compressing the spring $c^1$. The piston then occupies the position illustrated in Fig. 8 and the bearing of the rotor is then clamped. If on the other hand the valve $e^1$ is closed and the valve $f^1$ opened, the supply of motive fluid is cut off and the cylinder communicates with the outer air. The spring $c^1$ then expands, the piston is forced toward the left and the bearing of the rotor is unclamped. It is necessary therefore to maintain the valves $e^1$ and $f^1$ raised so long as the speed of the rotor has not reached a predetermined value and to maintain them lowered so long as the speed exceeds said value.

If the machine is furnished with a centrifugal tachometer $i^1$ having a vertical axis, its moving weights may be connected to the bottom of the valve $f^1$ as indicated in Fig. 8. The latter will be maintained raised so long as the centrifugal force developed by the moving weights is not sufficient to raise the masses of the tachometer. As soon as the speed becomes sufficiently great to raise the weights the valve system will fall by itself. It is only necessary therefore to regulate the masses of the tachometer so that its weights will rise when the speed attains the desired value.

What I claim is:—

1. Method of balancing a rotary body designed for high angular velocities, which consists in journaling said body in yieldingly supported bearings, rendering at least one of said bearings immovable while the speed of rotation of the body is below a determined speed, and releasing said bearing when the body exceeds the determined speed.

2. In combination with a yieldingly supported bearing, abutments for clamping said yielding bearing in a determined position located around the bearing, at least one of which is movable radially with relation to the others.

3. In combination with a yieldingly supported bearing, three movable abutments arranged 120° apart for clamping the bearing in a determined position, a rotatable ring having three eccentrically located pin-engaging slots formed therein, and a separate pin carried by each abutment engaging one of said slots.

4. In combination with a yieldingly supported bearing, movable abutments for confining the movement of said bearing, and means for actuating said abutments comprising a piston, a cylinder in which said piston operates, means for controlling the delivery of actuating fluid to and the discharge of fluid from said cylinder, and a tachometer for controlling the operation of said last mentioned means.

5. In combination with a yieldingly supported bearing, movable abutments for limiting the motion of said bearing, and means responsive to the speed of the element journaled in the bearing for controlling the operation of said abutments.

6. In combination with a rotatable member, a yieldingly mounted bearing for said member and abutments for limiting the lateral movement of said bearing, at least one of which is adjustable.

7. In combination with a rotatable element, a movable bearing for said element, abutments for limiting the lateral motion of said bearing, and means responsive to the speed of rotation of said element for varying the relative positions of said abutments.

In witness whereof I have hereunto set my hand in presence of two witnesses.

MAURICE LEBLANC.

Witnesses:
 HANSON C. COXE,
 GABRIEL BELLIARD.